No. 616,076. Patented Dec. 20, 1898.
C. P. CASE.
FASTENING FOR ARTIFICIAL LIMBS.
(Application filed July 9, 1897.)
(No Model.)
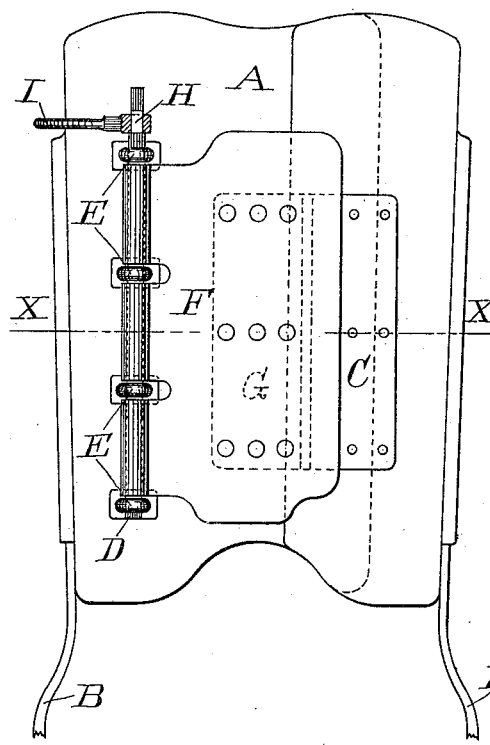
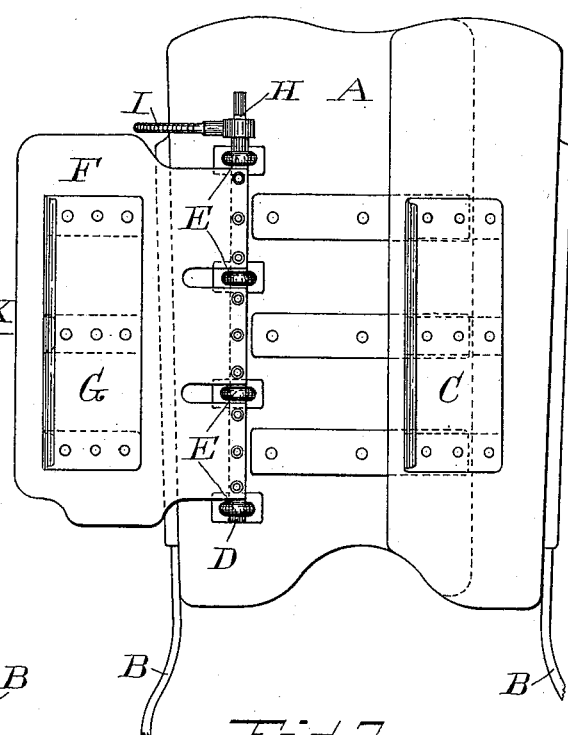
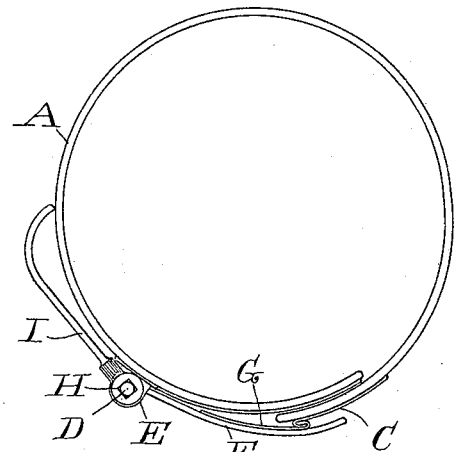
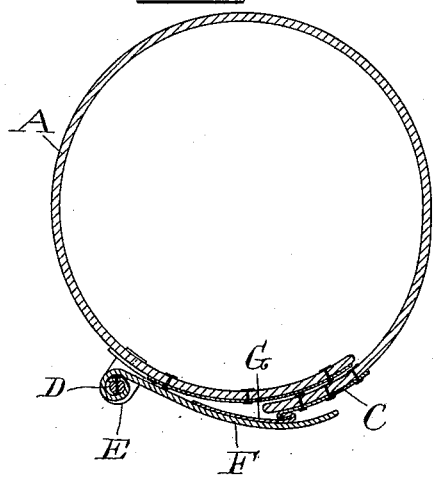
Witnesses:
J. W. Fisher.
Fred. J. Lawrence.
Inventor,
Charles P. Case.
by William H. Low,
Attorney.
THE NORRIS PETERS CO., PHOTO-LITHO., WASHINGTON, D. C.

UNITED STATES PATENT OFFICE.

CHARLES P. CASE, OF ALBANY, NEW YORK.

FASTENING FOR ARTIFICIAL LIMBS.

SPECIFICATION forming part of Letters Patent No. 616,076, dated December 20, 1898.

Application filed July 9, 1897. Serial No. 643,983. (No model.)

*To all whom it may concern:*

Be it known that I, CHARLES P. CASE, of Albany, in the county of Albany and State of New York, have invented new and useful Improvements in Fastenings for Artificial Limbs and Surgical Appliances, of which the following is a specification.

My invention relates to improvements in fastenings for artificial legs or other artificial limbs and for surgical appliances which require to be contractible to adapt them to different diameters; and it consists of the mechanism herein described and substantially as shown in the accompanying drawings.

The object of my invention is to provide a simple and efficient mechanism to effect a contraction of the socket in which the remaining part of an amputated limb is inserted to hold the artificial limb in its proper position or to effect a contraction of a contractible bandage for surgical uses and for any similar purpose, and I attain this object by the means shown in the drawings, which are herein referred to and form part of this specification, and in which—

Figure 1 is a front elevation of my fastening as applied to a contractible socket of an artificial leg, the fastening being shown in its closed condition, as when holding an artificial leg in position; Fig. 2, a like elevation showing the fastening loosened and parts turned back to expose parts that would otherwise be concealed; Fig. 3, a transverse section of Fig. 1 at the line X X, and Fig. 4 a plan view of Fig. 1.

As represented in the drawings, A designates the socket of an artificial leg, only a small portion of the latter being shown, said socket being provided with the usual flaps, arranged so that one will overlap the other, as shown in Fig. 4. Said socket is attached to joint-pieces B, which constitute the knee-joint of the artificial leg; but said joint-pieces form no part of my invention. Attached to the outer face of the undermost flap of the socket A there is a hook-plate C, which forms one member of my fastening; but when preferred a series of narrow straps of metal, each having a hook at its outer end, may be substituted for said hook-plate.

D is a shaft fitted to receive an intermittent rotative motion. Said shaft is journaled in bearings E, secured to the socket A. Secured to the shaft D there is a flexible apron or connection F, which is preferably made of strong but very flexible leather. The said connection has its inner end secured to the shaft D by means of pins, rivets, or other suitable fastenings that will hold said connection securely to the shaft and resist the strain to which the fastening is usually subjected. A hook-plate G is fixed to the inner side of the connection F and is provided with a hook that will engage with the hook of the hook-plate C. The outer end of the shaft D is provided with a squared portion H to receive the correspondingly-formed eye of a lever I, which is formed to be shifted into different radial positions on said shaft, and for the purpose of allowing the position of said lever to be changed without removing the latter entirely from the shaft D, which feature is especially desirable when the fastening is within the clothing of the wearer, the extremity of the outer end of said shaft is made cylindrical, but of a smaller diameter than the least diameter of the squared portion H, so that by moving the lever I toward the outer end of the shaft D the lever I can be shifted to change its radial position in respect to the shaft D. The connection F is adapted to be wound around the shaft D, so as to draw the hook-plate G toward said shaft, and the winding up of said connection F is preferably arranged so that the strain on the connection will be at the under side of the shaft, and when the connection F is wound up to the limit of its movement the lever I by taking against the thigh of the wearer of the artificial leg will act as a preventer to keep the connection F from being unrolled from the shaft D, so as to slacken the strain on the parts.

While I have shown and described my invention as applied to the fastening of an artificial limb, it should be understood that it is equally adapted to the contraction of contractible bandages and other surgical appliances.

My invention is operated in the following manner: The socket A or other appliance being placed in position, the hooks of the hook-plates C and G are engaged with each other. The lever I is then moved to impart a partial rotative motion to the shaft D, and by a continuance of the movement of said lever and shifting it into different positions the connection F will be wound around said shaft until the limit of its movement is attained. The lever I should then be fixed to bear against the thigh of the wearer or other means to stop the further movement of the lever. To loosen the fastening, the shaft D must be turned in the reverse direction until that purpose is attained, or the lever I may be slid onto the outer cylindrical portion of the shaft D, thereby leaving the shaft free to be turned in a direction to free the connection from its engagement with the hook-plate G.

What I claim as my invention, and am desirous of securing by Letters Patent, is—

1. In a fastener for artificial limbs, a fastening device consisting of an immovable hook-plate, a movable hook-plate engageable with the immovable hook-plate, a flexible connection connecting the movable hook-plate with a revoluble shaft, a revoluble shaft arranged to shorten said connection, and a lever attachable to and detachable from said shaft and adapted to form a detent for the latter, as herein specified.

2. The combination, with a stationary hook-plate, C, of a shaft, D, arranged to be intermittently rotated, a flexible connection, F, having one of its ends secured to said shaft and its opposite end provided with a hook-plate, G, which is adapted to engage with the hook-plate, C, and the means set forth for operating said shaft, substantially as specified.

3. In a fastening device, the combination of a shaft, D, arranged to be rotated intermittently and having a series of equiformed flat planes made on its perimeter, and a shiftable lever, I, provided with an eye that is fitted to engage with the flat planes of said shaft; said lever being adapted to form a preventer for retaining said shaft in an immovable position, substantially as specified.

4. In a fastener for artificial limbs, the combination of a shaft, D, adapted to receive an intermittent rotary motion and having a series of equiformed flat planes arranged circumferentially thereon to form a polygonal portion and a reduced cylindrical portion adjoining said planes, a flexible clasping-piece, F, connected to said shaft and adapted to engage with a hook-piece, C, and a lever, I, provided with an eye fitted to engage upon said polygonal portion but adapted to move loosely on the reduced cylindrical portion without imparting motion to said shaft, substantially as specified.

CHARLES P. CASE.

Witnesses:
WM. H. LOW,
J. W. FISHER.